United States Patent
Timken

(10) Patent No.: US 6,902,664 B2
(45) Date of Patent: *Jun. 7, 2005

(54) EXTREMELY LOW ACIDITY USY AND HOMOGENEOUS, AMORPHOUS SILICA-ALUMINA HYDROCRACKING CATALYST AND PROCESS

(75) Inventor: Hye Kyung C. Timken, Albany, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/291,061

(22) Filed: Nov. 8, 2002

(65) Prior Publication Data

US 2004/0092385 A1 May 13, 2004

(51) Int. Cl.⁷ .................. C10G 47/16; C10G 47/20; B01J 29/08; B01J 29/10
(52) U.S. Cl. .............. 208/111.01; 208/111.3; 208/111.35; 502/79; 502/64; 502/66; 502/305; 502/313; 502/314; 502/325
(58) Field of Search .............. 208/111.01, 111.3, 208/111.35; 502/79, 64, 66, 305, 313, 314, 325

(56) References Cited

U.S. PATENT DOCUMENTS

| | | | |
|---|---|---|---|
| 3,130,007 A | 4/1964 | Breck | |
| 3,536,605 A | 10/1970 | Kittrell | |
| 3,835,027 A | 9/1974 | Ward | |
| 3,853,747 A | 12/1974 | Young | |
| 3,867,277 A | 2/1975 | Ward | |
| 3,897,327 A | 7/1975 | Ward | |
| 4,239,651 A | 12/1980 | Alafandi et al. | |
| 4,289,653 A | 9/1981 | Jaffe | |
| 4,419,271 A | 12/1983 | Ward | |
| 4,499,197 A | 2/1985 | Seese et al. | |
| 4,661,239 A | 4/1987 | Steigleder | |
| 4,711,868 A | 12/1987 | Shyr et al. | |
| 4,820,402 A | 4/1989 | Partridge et al. | |
| 4,857,170 A | 8/1989 | Hoek et al. | |
| 4,857,171 A | 8/1989 | Hoek et al. | |
| 4,894,142 A | 1/1990 | Steigleder | |
| 4,916,096 A | 4/1990 | Hoek et al. | |
| 4,988,659 A | 1/1991 | Pecoraro | |
| 5,053,374 A | * 10/1991 | Absil et al. ............ | 502/64 |
| 5,059,567 A | 10/1991 | Linsten et al. | |
| 5,171,422 A | 12/1992 | Kirker et al. | |
| 5,190,903 A | 3/1993 | Steigleder | |
| 5,342,507 A | 8/1994 | Dai et al. | |
| 5,393,409 A | 2/1995 | Jan et al. | |
| 5,834,572 A | 11/1998 | Derleth et al. | |
| 6,210,563 B1 | 4/2001 | Tsao et al. | |
| 6,267,874 B1 | 7/2001 | Iijima et al. | |
| 6,399,530 B1 | 6/2002 | Chen et al. | |

FOREIGN PATENT DOCUMENTS

| | | |
|---|---|---|
| EP | 0 028 938 B1 | 5/1985 |
| EP | 0 310 165 B1 | 4/1989 |
| EP | 0 671 457 A2 | 9/1995 |
| EP | 0 671 457 A3 | 3/1996 |
| EP | 0 366 207 A1 | 5/1999 |
| GB | 2 014 970 A | 9/1979 |
| WO | WO 00/40675 | 7/2000 |

* cited by examiner

Primary Examiner—Walter D. Griffin
(74) Attorney, Agent, or Firm—Steven H. Roth

(57) ABSTRACT

A catalyst composition comprising a minor amount of a low acidity, highly dealuminated ultra stable Y zeolite having an Alpha value of less than about 5, preferable less than about 3 and Broensted acidity measured by FT-IR from about 1 to about 20, preferably from about 1–10, micro mole/g of, a homogeneous, amorphous silica-alumina cracking component having an SB ratio of from about 0.7 to about 1.3, wherein a crystalline alumina phase is present in an amount of no greater than about 10%, preferably no greater than 5% and a catalytic amount of hydrogenation component selected from the group consisting of a Group VI metal, a Group VIII metal, and mixtures thereof is disclosed. The present invention provides for a process for converting hydrocarbonaceous oils comprising contacting the hydrocarbonaceous oils with the catalyst under suitable hydrocarbon conversion conditions. Such processes in include, but are not limited to, single stage hydrocracking, two-stage hydrocracking, series-flow hydrocracking, mild hydrocracking, lube hydrocracking, hydrotreating, lube hydrofinishing, hydrodesulphurization, hydrodenitrification, catalytic dewaxing and catalytic cracking.

31 Claims, No Drawings

EXTREMELY LOW ACIDITY USY AND HOMOGENEOUS, AMORPHOUS SILICA-ALUMINA HYDROCRACKING CATALYST AND PROCESS

FIELD OF THE INVENTION

The present invention relates to catalysts and processes using the catalysts for converting hydrocarbonaceous oils to products of an average lower molecular weight and an average lower boiling point.

BACKGROUND OF THE INVENTION

Modern hydrocracking catalysts are generally based on zeolitic materials due to their advantages over earlier refractory oxide based materials such as silica-alumina, magnesia, and alumina. Amorphous catalysts have relatively poor activity but higher selectivity for production of distillate range product while zeolite catalysts provide higher activity but poorer selectivity for distillate, particularly for the heavy-distillate fraction. Among other things, the present invention provides a hydrocracking process with superior overall catalytic performance over amorphous silica-alumina cogel catalyst while maintaining the excellent heavy-distillate selectivity and unconverted oil quality of the amorphous cogel catalyst.

In state-of-the-art cogel hydroprocessing catalysts, various combination of metals, their oxides and sulfides, from Group VI-B and Group VIII of the Periodic Table, were precipitated or cogelled with the base. Therefore, the deposition of metals by cogellation was considered superior to impregnation of the metals on the base (post-metal impregnation), since the latter method tended to produce non-uniform deposits of active metals. The increased costs of production inherent in cogellation or precipitation were simply borne in order to obtain more uniform catalyst which had better distillate selectivity and produced a superior quality product.

The present invention provides, among other things, a novel post-metal-impregnated, hydrocracking catalyst made with homogeneous silica-alumina and highly dealuminated ultrastable Y zeolite (USY) which produces a number of unexpected benefits including: the catalyst activity is improved significantly over the state-of-the-art amorphous cogel catalyst, and at the same time the total distillate yield increased. The catalysts of the invention are very stable and showed significantly lower fouling rates than the cogel catalyst.

It is well known that addition of USY to a cogel hydrocracking catalyst generally lowers the distillate yield, particularly the heavy-distillate fraction with 550°–700° F. boiling point range. The catalyst of the present invention is particularly effective with respect to maintaining the yield of a heavy-distillate fraction. The hydrocracked heavy-distillate fraction from vacuum gas oil typically exhibits very high Cetane Numbers of 60–80, while a light-distillate fraction with 250°–550° F. boiling point range exhibits Cetane Numbers of 40–55. In order to achieve a high Cetane Number for the combined diesel fuel, it is desirable to increase the heavy-distillate content in the combined distillate pool. Moreover, the unconverted 700° F.$^+$ fraction in a process according to the invention exhibits high viscosity index indicating that a high quality lubricating oil bas stock can be produced from that fraction.

An early synthetic zeolite Y was described in U.S. Pat. No. 3,130,007 issued Apr. 21, 1964, which is incorporated herein by reference. A number of modifications have been reported for this material, one of which is ultrastable Y zeolite as described in U.S. Pat. No. 3,536,605 issued Oct. 27, 1970, which is incorporated herein by reference. Zeolite Y has been constantly improved by techniques like ammonium ion exchange and acid extraction, and various forms of calcination in order to improve the performance of the hydrocracking catalysts.

To further enhance the utility of synthetic Y zeolite and depending upon the hydroprocessing problem sought to be solved, additional components have been added by means known in the art. U.S. Pat. No. 3,835,027 to Ward et al., which is incorporated herein by reference, describes a catalyst containing at least one amorphous refractory oxide, a crystalline zeolitic aluminosilicate and a hydrogenation component selected from the Group VI and VIII metals and their sulfides and oxides. Ward et al. teach that the added materials enhance the catalytic and denitrogenation activity of the catalyst.

U.S. Pat. No. 3,897,327 to Ward, which is incorporated herein by reference, describes a hydrocracking process using a sodium Y zeolite wherein the Y zeolite has a preliminary ammonium ion exchange to replace most of the sodium ion with ammonium ions. This product is then calcined in the presence of at least 0.2 psi of water vapor for a sufficient time to reduce the cell size to a range between 24.40–24.64 Å. The patent teaches that the catalyst has increased hydrothermal stability by maintaining crystallinity and surface area after calcination, exposure to water vapor or water vapor at high temperatures.

In addition to various catalyst compositions, preparation techniques have been discovered to also affect catalytic selectivity. U.S. Pat. No. 3,867,277 to Ward, which is incorporated herein by reference, discloses the use of a Y type zeolite catalyst in a low pressure hydrocracking process. The catalyst described in the patent requires the Y zeolite to be double-exchanged and double-calcined wherein the first calcination step uses a relatively high temperature (950°–1800° F.) and the second calcination step uses relatively low temperatures (750°–1300° F.) to yield a catalyst that is stable in ammonia environments.

U.S. Pat. No. 3,853,747 to Young, which is incorporated herein by reference, teaches that hydrocracking activity of the catalyst is greater when the hydrogenating component is incorporated in the zeolite in such a manner as to avoid impregnation into the inner adsorption area of the zeolite crystallites or particles. For example, the mixing may consist of stirring, mulling, grinding, or any conventional procedure for obtaining an intimate mixture of solid material. The dispersion of the Group VIB metal hydrogenation component is achieved by adding it to the zeolite in a finely divided but essentially undissolved form. The patent teaches that in some cases the soluble molybdenum or tungsten compounds added to the zeolite by impregnation tends to destroy the zeolite crystal structure and acidity during the subsequent drying and calcination steps. Young teaches, however, that the particle size should range from 0.5 microns to 5 microns.

U.S. Pat. No. 4,857,171 to Hoek et al., which is incorporated herein by reference, teaches a process for converting hydrocarbon oils comprising contacting the oil with a catalyst consisting essentially of a Y zeolite having a unit cell size less than 24.40 Å, a silica based amorphous cracking component, a binder and at least one hydrogenation component selected from the group consisting of a Group VI metal, and/or a Group VIII metal and mixtures thereof.

U.S. Pat. No. 4,419,271 to Ward, which is incorporated herein by reference, discloses a composition matter useful as a catalyst base for supporting active hydrogenation metal components or for catalyzing acid catalyzed hydrocarbon conversion reactions comprising in intimate heterogeneous mixture (1) a modified hydrogen crystalline aluminosilicate Y zeolite having activity for catalytically cracking hydrocarbons and having a unit cell size between 24.25 and 24.35 Å and a water absorption capacity, at 4.6 mm water vapor partial pressure and 25° C., less than 8% by weight of zeolite and (2) a dispersion of silica-alumina in a gamma alumina matrix.

U.S. Pat. No. 4,820,402 to Partridge et al., which is incorporated herein by reference, discloses the use of a highly siliceous large pore zeolite as the acidic component of a catalyst in a process for improved distillate selectivity.

U.S. Pat. No. 5,171,422 to Kirker et al., which is incorporated herein by reference, discloses a process for producing a high quality lube base stock with a USY catalyst with greater than 50:1 silica:alumina ratio.

WO 00/40675, which is incorporated herein by reference, discloses a low pressure hydrocracking process using a catalyst comprising zeolite USY with a framework silica to alumina molar ratio of at least 200:1 preferably greater than 2000:1, and a hydrogenation component.

GB-A-2,014,970 discloses an ultra hydrophobic zeolite Y which has been given a unit cell size dimension of 24.20–24.45 Å by two ammonium exchange steps with an intermediate calcinations step at 550°–800° C. in steam. EP-B-0,028,938 discloses the use of such a modified zeolite for selective conversion of hydrocarbons boiling above 371° C. into midbarrel fuel products having a distillation range of 149°–371° C. Improved manufacturing process for producing 24.25–24.35 Å unit cell size Zeolite Y was disclosed in U.S. Pat. No. 5,059,567 to Linsten et al.

Silica-alumina compounds are well known as catalysts used in hydrocarbon conversion processes. Silica-alumina catalysts such as in the present invention can be used "as is", particularly in reactions that require acidic catalysts, or can optionally be combined with zeolites, clays or other binders, and inorganic oxides for the cracking of liquid hydrocarbons in cracking reactors such as fluid catalytic crackers and hydrocrackers. Silica-alumina composites have been used commercially for a variety of hydrocarbon processing applications, such as cracking, desulphurization, demetalation, and denitrification.

Amorphous silica-alumina has been prepared previously by a modified cogel process wherein no hydrogenation metals were added during the gellation step. Spray dried, amorphous silica-alumina catalysts were made by the method as described in U.S. Pat. No. 4,988,659, Pecoraro to produce catalysts used in hydrocarbon conversion processes.

The method of preparation of silica-alumina catalysts affects the chemical and physical properties of the catalysts such as activity (such as cracking or isomerization activity), and physical properties (such as pore structure and volume, surface area, density and catalyst strength). Silica-alumina catalysts such as in the present invention can be used "as is", particularly in reactions that require acidic catalysts, or can optionally be combined with zeolites, clays or other binders, and inorganic oxides for the cracking of liquid hydrocarbons in cracking reactors such as fluid catalytic crackers.

Numerous silica-alumina catalyst compositions and processes for their preparation are described in the patent literature. The patent literature teaches a number of ways to prepare these compositions.

U.S. Pat. No. 4,499,197, Seese et al., for example, describes the preparation of inorganic oxide hydrogels, and more particularly, catalytically active amorphous silica-alumina and silica-alumina rare earth cogels. The active cogels are prepared by reacting aluminate and silicate solutions to obtain a silica-alumina pregel, and then reacting the pregel with an acidic rare earth and an aluminum salt solution with complete mixing. U.S. Pat. No. 4,239,651, Alfandi et al. discloses a process for preparing exchanged ammonium cogels.

U.S. Pat. No. 4,289,653, Jaffe teaches preparing an extruded catalyst by mixing aluminum sulfate and sulfuric acid with sodium silicate to form a silica sol in an alumina salt solution at pH of 1–3, adding NH$_4$OH under substantially constant pH of at least 4 to 6; adding more NH$_4$OH to form a cogelled mass to pH 7.5–8.5; washing cogelled mass; mulling the mass with peptizing agent, a Group VI-B metal compound and a Group VIII metal compound to form extrudable dough; extruding; and drying and calcining.

U.S. Pat. No. 4,988,659, Pecoraro teaches a cogelled, silica-alumina matrix prepared by the method which comprises mixing a silicate solution with an aqueous solution of an acid aluminum salt and an acid, to form an acidified silica sol in said aluminum salt solution, and adjusting said silica sol/aluminum salt solution mixture to a pH in the range of about 1 to 4; slowly adding sufficient base with vigorous stirring, to said acidified silica sol/aluminum salt solution mixture to form a cogel slurry of silica and alumina, and to adjust said slurry to a pH in the range of about 5 to 9; aging said cogel slurry at a temperature of ambient to 95° C.; adjusting the pH of said cogel slurry to about 5 to 9; recovering a cogelled mass from said slurry; washing said cogelled mass; adjusting the pH of said cogelled mass to between about 4 and 7, and controlling conditions to induce syneresis; and forming said combination into particles.

SUMMARY OF THE INVENTION

An embodiment of the present invention is a process for converting hydrocarbonaceous oils into products of lower average molecular weight and lower average boiling point comprising contacting said hydrocarbonaceous oils under hydrocracking conditions with a catalyst comprising (1) a minor amount of a low acidity, highly dealuminated ultrastable Y zeolite having an Alpha value of less than about 5, preferable less than about 3, and Broensted acidity of from about 1 to about 20, preferably about 1–10 micromole/g, (2) a homogeneous, amorphous silica-alumina cracking component having a Surface to Bulk Si/Al ratio (SB ratio) of from about 0.7 to about 1.3, wherein a crystalline alumina phase is present in an amount of no greater than about 10%, preferably no greater than 5% and (3) a catalytic amount of hydrogenation component selected from the group consisting of a Group VI metal, a Group VIII metal, and mixtures thereof.

Another embodiment on the present invention is a process for producing high quality distillate with increased yield of heavy distillate from heavy gas oils comprising contacting a heavy gas oil under hydrocracking conditions with a catalyst comprising (1) a minor amount of a low acidity, highly dealuminated ultrastable Y zeolite having an Alpha value of less than about 5, preferable less than about 3, and Broensted acidity of from about 1 to about 20, preferably from about 1–10 micromole/g measured by FT-IR, (2) a homogeneous, amorphous silica-alumina cracking component having an SB ratio of from about 0.7 to about 1.3, wherein a crystalline alumina phase is present in an amount of no greater than about 10%, preferably no greater than 5% and (3) a catalytic amount of hydrogenation component selected from the group consisting of a Group VI metal, a Group VIII metal, and mixtures thereof.

Another embodiment of the present invention is a hydrocracking catalyst composition comprising (1) a minor amount of a low acidity, highly dealuminated ultrastable Y zeolite having an Alpha value of less than about 5, preferable less than about 3, and having Broensted acidity of from about 1 to about 20, preferably about 1–10 micromole/g measured by FT-IR, (2) a homogeneous, amorphous silica-alumina cracking component having an SB ratio of from about 0.7 to about 1.3, wherein a crystalline alumina phase is present in an amount of no greater than about 10%, preferably no greater than 5% and (3) a catalytic amount of hydrogenation component selected from the group consisting of a Group VI metal, a Group VIII metal, and mixtures thereof.

It has now been found, among other things, that the presence of a minor amount of a low acidity, highly dealuminated ultrastable Y zeolite having an Alpha value of less than about 5 and Broensted acidity of from about 1 to about 20 micromole/g as measured by FT-IR, together with a homogeneous, amorphous silica-alumina cracking component having an SB ratio of from about 0.7 to about 1.3, wherein a crystalline alumina phase is present in an amount of no greater than about 10% and a catalytic amount of hydrogenation component selected from the group consisting of a Group VI metal, a Group VIII metal, and mixtures thereof produced unexpected benefits. Such benefits include: (1) the catalyst activity is improved significantly; (2) the total distillate yield is maintained over a broad range of USY concentrations, (3) the respective yields of light-distillate vs. heavy-distillate can be adjusted by varying the USY concentration; and (4) the catalyst became much more stable and showed significantly lower fouling rates.

DESCRIPTION OF THE PREFERRED EMBODIMENTS

In accordance with the one embodiment of the present invention, the catalyst comprises (1) a minor amount of a low acidity, highly dealuminated ultrastable Y zeolite having an Alpha value of less than about 5, preferable less than about 3, and Broensted acidity of from about 1 to about 20, preferably about 1–10 micromole/g, (2) a homogeneous, amorphous silica-alumina cracking component having an SB ratio of from about 0.7 to about 1.3, wherein a crystalline alumina phase is present in an amount of no greater than about 10%, preferably no greater than 5% and (3) a catalytic amount of hydrogenation component selected from the group consisting of a Group VI metal, a Group VIII metal, and mixtures thereof.

The amount of highly dealuminated USY zeolite in the catalyst compositions in accordance with the present invention on a finished catalyst basis including metals ranges from about 0.5–70% by weight, preferably, from about 0.5–50% and most preferably from about 1–20%.

Highly dealuminated USY zeolites having a silica to alumina molar ratio greater than 50 are useful as the zeolite component of the catalyst compositions according to the present invention. Preference is given to USY zeolites having a silica: alumina molar ratio greater 60, and most preferably having silica: alumina molar ratio greater than 80.

Due to the extremely low acidity of the USY, the hydrocracking catalysts of the present invention require the addition of a secondary amorphous cracking component. Consequently, the catalysts of the present invention also include an amorphous cracking component which comprises a homogeneous, amorphous silica-alumina cracking component having an SB ratio of from about 0.7 to about 1.3, wherein a crystalline alumina phase is present in an amount of no greater than about 10%, preferably no greater than 5%.

The amount of amorphous cracking component in the catalyst compositions in accordance with the present invention on a finished catalyst basis including metals, ranges from about 10%–80% by weight, preferably from about 30%–70% by weight and most preferably from about 40%–60%. The amount of silica in the silica-alumina ranges from about 10%–70% by weight. Preferably, the amount of silica in the silica-alumina ranges from about 20%–60% by weight, and most preferably the amount of silica in the silica-alumina ranges from about 25%–50% by weight.

The binder(s) present in the catalyst compositions suitably comprise inorganic oxides. Both amorphous and crystalline binders can be applied. Examples of suitable binders comprise silica, alumina, clays and zirconia. Preference is given to the use of alumina as binder. The amount of binder in the catalyst compositions in accordance with the present invention on a finished catalyst basis including metals ranges 10%–30% by weight, and is preferably from about 15%–25% by weight.

The catalysts of the present invention also comprise a hydrogenation component. As used herein the hydrogenation component mainly means metals of Group VI and VIII in the Periodic Table, for example, chromium, molybdenum, tungsten, iron, cobalt, nickel, platinum, palladium, and the like metals and oxides and sulfides of these metals. These metals may be used in combination of two or more members. For example, combination of metals such as nickel-tungsten, nickel-molybdenum cobalt-molybdenum, platinum-palladium, and the like.

The amount(s) of hydrogenation component(s) in the catalyst compositions suitably range from about 0.2% to about 10% by weight of Group VIII metal component(s) and from about 5% to about 30% by weight of Group VI metal component(s), calculated as metal(s) per 100 parts by weight of total catalyst.

The hydrogenation components in the catalyst compositions may be in the oxidic and/or the sulphidic form. If a combination of at least a Group VI and a Group VIII metal component is present as (mixed) oxides, it will be subjected to a sulphiding treatment prior to proper use in hydrocracking.

The catalyst compositions in accordance with the present invention comprise about 1%–10% by weight of nickel and about 5%–40% by weight tungsten. Preferably, the catalyst compositions in accordance with the present invention comprise about 2%–8% by weight of nickel and about 8%–30% by weight tungsten, calculated as metals per 100 parts by weight of total catalyst.

When noble metal is used, the catalyst compositions in accordance with the present invention comprise about 0.1%–5% by weight of platinum, or palladium, or a combination of Pt and Pd. Preferably, the catalyst compositions in accordance with the present invention comprise about 0.2%–2% by weight of platinum, or palladium, or a combination of Pt and Pd, calculated as metals per 100 parts by weight of total catalyst.

It has been found that excellent and unexpected results in terms of performance and activity are obtained using catalysts according to the present invention. Some of these results include: the catalysts of the invention are particularly good for producing more heavy-distillate with 550°–700° F. boiling point range (over 70 Cetane); catalysts of the invention show comparable or lower gas-make than a reference catalyst; and catalysts of the invention produce less naphtha during the hydrocracking process by suppressing undesirable overcracking reactions.

In addition, the present invention provides for a process for converting hydrocarbonaceous oils into products of lower average molecular weight and lower average boiling point comprising contacting said hydrocarbonaceous oils under hydrocracking conditions with a catalyst comprising a low acidity, highly dealuminated ultrastable Y zeolite having an Alpha value of less than about 5 and Broensted acidity of from about 1 to about 20 micromole/g, a homogeneous, amorphous silica-alumina cracking component having an SB ratio of from about 0.7 to about 1.3, wherein a crystalline alumina phase is present in an amount of no greater than about 5% and a catalytic amount of hydrogenation component selected from the group consisting of a Group VI metal, a Group VIII metal, and mixtures thereof.

The present invention is also directed to a process for producing high quality distillate and lubricating oil base stock in increased yields from heavy gas oils comprising contacting a heavy gas oil under hydrocracking conditions with a catalyst a minor amount of a low acidity, highly dealuminated ultrastable Y zeolite having an Alpha value of less than about 5, preferable less than about 3 and Broensted acidity of from about 1 to about 20, preferably about 1–10 micromole/g as measured by FT-IR, a homogeneous, amorphous silica-alumina cracking component having an SB ratio of from about 0.7 to about 1.3, wherein a crystalline alumina phase is present in an amount of no greater than about 10%, preferably no greater than 5%, and a catalytic amount of hydrogenation component selected from the group consisting of a Group VI metal, a Group VIII metal, and mixtures thereof.

A catalyst according to the present invention is particularly good for increasing the yield of a heavy-distillate fraction with 550°–700° F. boiling point range. The hydrocracked heavy-distillate fraction from vacuum gas oil typically exhibits very high Cetane Numbers of 60–80, while a light-distillate fraction with 250°–550° F. boiling point range exhibits Cetane Numbers of 40–55. In order to achieve high a Cetane Number for the combined diesel fuel, it is desirable to increase the heavy-distillate yield in the combined distillate pool.

The present invention also provides a process for production of a feedstock for lubricating oil base stock comprising contacting the catalyst of the invention with a hydrocarbon oil feedstock boiling above about 650° F. under hydrogenation and conditions to produce a feedstock for lubricating oil base stock. The unconverted 700° F.$^+$ fraction from our invention exhibits high viscosity index indicating high quality lubricating oil base stock can be produced.

Hydroconversion process configurations in accordance with the present invention are those wherein a substantial reduction in average molecular weight and boiling point can be accomplished by contacting the feed with a catalyst composition comprising a low acidity, highly dealuminated ultrastable Y zeolite having an Alpha value of less than about 5 and Broensted acidity of from about 1 to about 20 micromole/g, a homogeneous, amorphous silica-alumina cracking component having an SB ratio of from about 0.7 to about 1.3, wherein a crystalline alumina phase is present in an amount of no greater than about 10%, and a catalytic amount of hydrogenation component selected from the group consisting of a Group VI metal, a Group VIII metal, and mixtures thereof.

Examples of such hydrocarbon conversion processes in which the catalysts of the present invention may be used are well known in the art and include, but are not limited to, single-stage hydrocracking, two-stage hydrocracking, series-flow hydrocracking, mild hydrocracking, lube hydrocracking, hydrotreating, lube hydrofinishing, hydrodesulphurization, hydrodenitrification, catalytic dewaxing and catalytic cracking.

Feedstocks which can be suitably applied in the process according to the present invention comprise gas oils, vacuum gas oils, deasphalted oils, long residues, catalytically cracked cycle oils, coker gas oils and other thermally cracked gas oils and syncrudes, optionally originating from tar sands, shale oils, waxy hydrocarbons from Fischer-Tropsch hydrocarbon synthesis process, residue upgrading processes or biomass. Combinations of various feedstocks can also be applied.

It may be desirable to subject part or all of the feedstock to one or more (hydro) treatment steps prior to its use in the hydrocarbon conversion process according to the present invention. It is often found convenient to subject the feedstock to a (partial) hydrotreatment. When rather heavy feedstocks are to be processed it will be advantageous to subject such feedstocks to a (hydro) demetallization treatment.

Suitable hydrocracking conditions to be applied comprise temperatures ranging from about 250° C. to about 500° C., pressures up to about 300 bar and space velocities from about 0.1 to about 10 kg feed per liter of catalyst per hour (kg/l/h). Hydrogen gas to feed ratios range from about 100 to about 5000 Nl/kg feed (normal liters at standard temperature and pressure per kilogram) can suitably be used.

Preferably, hydrocracking conditions to be applied comprise temperatures ranging from about 300° C. to about 450° C., pressures from about 25 bar to about 200 bar and space velocities from about 0.2 to about 10 kg feed per liter of catalyst per hour (kg/l/h). Hydrogen gas to feed ratios preferably range from about 250 to about 2000 Nl/kg are applied.

Use of powder X-ray diffraction (XRD) for characterization of USY is well known per ASTM method D 3942-80. The unit cell size of the USY is inversely correlated with the Al content in the USY. As USY become more dealuminated, the unit cell size of USY is changing from 24.70 Å to 24.54 Å or below. However, for severely dealuminated and ultrastabilized USY with bulk $SiO_2/Al_2O_3$ ratio of over 50, the cracking activity of USY could not be differentiated with the XRD unit cell size. Instead, FT-IR, and Alpha test (a model compound test for activity measurement) were used to analyze the activity of the USY samples. Standard analysis tests such as bulk composition analysis by ICP and surface area measurements were used to ensure the quality of USY samples.

Transmission IR spectroscopy was used to compare the acidity of USY samples per published methods elsewhere (T. R. Hughes, H. M. White, J. Phys. Chem., 71,2192,1967; M. A. Makarova, A. Garforth, V. L. Zholobenko, J. Dwyer, G. J. Earl, D. Rawlence, Studies in Surface Science and Catalysis, 84, 365, 1994). Two methods were employed: (1) measurement of the acidic OH stretching bands in the 3600 $cm^{-1}$ region of the spectrum; and (2) adsorption of pyridine to determine the Broensted to Lewis acid site concentrations. Self-supporting wafers weighing about 10 mg were dehydrated in-situ by heating in flowing He at 5° C./min to 400° C. and left at this temperature for 1 hour. The wafers were then cooled to 150° C. and the IR spectrum was recorded. This spectrum was fitted to obtain the intensities of the OH bands for the different acidic sites. Pyridine was also used to measure acidity. Once the samples were dehydrated according to the above method, the IR cell was isolated and then 4 uL (microliter) of pyridine was injected. The pyridine was allowed to adsorb for 1 hour and then the cell was reopened to flowing He to allow desorption of the physically adsorbed pyridine. Typically, desorption was allowed for 12–17 hours, then FT-IR spectra were obtained for the USY sample containing residual chemisorbed pyridine. These spectra were then fitted in the pyridine ring vibration and OH stretching regions to obtain the peak areas as a function of desorption time. The final peak areas were obtained by extrapolating to infinite desorption time.

It is plausible, other Broensted acidity measurement techniques such as solid-sate NMR and temperature programmed desorption with a base (e.g., $NH_3$ TPAD) could also be used to select the optimum range.

The cracking activity of USY was determined by the Alpha test which was adapted from the published descriptions of the Mobil Alpha test (P. B. Weisz and J. N. Miale, *J. Catal.*, 4, 527–529, 1965; J. N. Miale, N.Y. Chen, and P. B. Weisz, *J. Catal.*, 6, 278–87, 1966). The "Alpha Value" is calculated as the cracking rate of the sample in question divided by the cracking rate of a standard silica alumina sample. The resulting "Alpha" is a measure of acid cracking activity which generally correlates with number of acid sites. Other model compound testing with paraffinic hydrocarbons could also be used to select the optimum range of USY acidity.

The silica-alumina composition of the present invention is amorphous and homogeneous. A "Surface to Bulk Si/Al Ratio" (SB Ratio) has been selected as the measure used to define the homogeneity characteristic of the silica-alumina of the present invention and to compare it with other silica-alumina compositions.

$$SB \text{ Ratio} = \frac{(\text{Si/Al atomic ratio of the surface measured by } XPS)}{(\text{Si/Al atomic ratio of the bulk measured by elemental analysis})}$$

To determine the SB ratio, the Si/Al atomic ratio of the silica-alumina surface is measured using x-ray photoelectron spectroscopy (XPS). XPS is also known as electron spectroscopy for chemical analysis (ESCA). Since the penetration depth of XPS is less than 50 Å, the Si/Al atomic ratio measured by XPS is for the surface chemical composition. Use of XPS for silica-alumina characterization was published by W. Daneiell et al. in Applied Catalysis A, 196, 2000, pp 247–260. The XPS technique is, therefore, effective in measuring the chemical composition of the outer layer of catalytic particle surface. Other surface measurement techniques, such as Auger electron spectroscopy (AES) and Secondary ion mass spectroscopy (SIMS), could also be used for measurement of the surface composition.

Separately, the bulk Si/Al ratio of the composition is determined from ICP elemental analysis. Then, by comparing the surface Si/Al ratio to the bulk Si/Al ratio, the SB ratio and the homogeneity of silica-alumina are determined.

How the SB ratio defines the homogeneity of a particle is explained as follows. An SB ratio of 1.0 means the material is completely homogeneous throughout the particles. An SB ratio of less than 1.0 means the particle surface is enriched with aluminum (or depleted with silicon), and aluminum is predominantly located on the external surface of the particles. The SB ratio of more than 1.0 means the particle surface is enriched with silicon (or depleted with aluminum), and aluminum is predominantly located on the internal area of the particles.

A silica-alumina composition is homogeneous and is in accordance with the present invention when its Surface to Bulk ratio (SB ratio), i.e., the ratio of the Si/Al atomic ratio of the composition measured by XPS at the surface and the Si/Al atomic ratio of the bulk measured by elemental analysis is from about 0.7 to about 1.3.

The SB ratio of reference silica-alumina samples from two commercial sources (Siral-40 from SasolCondea and MS-25 from W. R. Grace) was measured and the following values were obtained:

SB ratio of Siral-40 silica-alumina=2.1–2.8

SB ratio of MS-25 silica-alumina=0.2–0.6

The above results indicate that Siral type of silica-alumina is enriched with silicon on the surface of the particles (i.e., depleted with Al) as published earlier by W. Daneiell et al. in Applied Catalysis A, 196, 2000, pp 247–260. On the other hand, MS-25 silica-alumina is enriched with aluminum on the surface of the particles. The silica-alumina in accordance with the present invention has an SB ratio of from about 0.7 to about 1.3, preferably from about 0.9 to about 1.1 and is homogeneous and highly homogeneous, respectively, in that the aluminum is distributed essentially uniformly throughout the particles. To maximize the activity of the silica-alumina, it is most preferable to have a highly homogeneous silica-alumina having an SB ratio of about 1.0.

In addition to being homogeneous or highly homogeneous, the silica-alumina compositions of the present invention are amorphous, wherein a crystalline alumina phase, such as pseudoboehmite phase, is present in an amount no greater than about 10%, preferably no greater than about 5%.

Silica-alumina according to the present invention may be prepared by a variety of methods employing batch and continuous processes in different combinations.

The two most important steps in the preparation of a silica-alumina cogel are (1) preparation of the clear sol containing silica and alumina and (2) gellation of the sol using a base solution. See U.S. Pat. No. 4,289,653, Jaffe and U.S. Pat. No. 4,988,659, Pecoraro, both of which are incorporated by reference herein. See also commonly assigned U.S. Patent Application titled "Method for Preparing a Highly Homogenous Amorphous Silica-Aluminum Composition", filed concurrently herewith and incorporated by reference herein.

The starting materials for the sol preparation step include aluminum salt, acid, and a silica source. The aluminum salt source that can be used for the synthesis includes aluminum sulfate, aluminum nitrate, aluminum chloride, aluminum bromide, aluminum iodide, aluminum acetate and aluminum metal or alumina dissolved in acid. Feasible acid sources include acetic acid, formic acid, sulfuric acid, hydrochloric acid, and nitric acid. The silicate sources include, but are not limited to, sodium silicate, precipitated silica dissolved in a base, and colloidal silica.

The sol preparation can be done either via a batch process or a continuous process. It is critical to maintain the pH less than 3.0, preferably less than 2.5, and to ensure vigorous and complete mixing of the aluminum salt and silicate solutions to minimize any unwanted gel or particle formation.

A basic precipitant such as ammonium hydroxide is then added to the acidified sol solution. The addition of the precipitant raises the pH of the sol above 3, resulting in cogelling the silica and alumina species. Dilute ammonia solution is the preferred base for the gellation. In addition to dilute ammonia, other bases such as NaOH, $NaAlO_2$, KOH can also be used for the gellation.

The gellation step can be done either via batch process or continuous process. The desirable final gellation pH is in the range of 5–9, preferably 6–8. It is critical to have complete, vigorous mixing of the Si—Al solution with the basic precipitant, and to maintain uniform pH throughout the mixture during the precipitant addition step in order to minimize formation of isolated silica domains and alumina domains.

The precipitated cogel needs to be washed to remove any unreacted silicate and aluminum salt, and then it is ammonium exchanged to remove sodium. The cogel should be aged for approximately 2–5 hours at room temperature or at an elevated temperature of up to about 90° C. and the aged cogel may be spray-dried for convenience in handling and storage, or may be further processed to the final catalyst from the moist state. If the extrudate composition is in the dry form, such as spray-dried powders, sufficient water should be added with the acetic acid to produce a moisture content of approximately 60% by weight. After mulling for approximately 1 hour, optionally in the presence of peptizing acid or base, the material will attain a plastic or doughy state which is suitable for extrusion in commercial extrusion apparatus.

If desired, the material may be extruded, dried and calcined to produce a silica-alumina catalyst or catalyst support. The preferred method of drying and calcining includes an initial drying step in an air-purged oven at 65°–175° C. and a final calcination at 480–650° C. for 0.5–5 hours in a furnace or kiln. These and other methods of finishing the material are set forth in U.S. Pat. No. 4,289,653, Jaffe, incorporated by reference herein.

The following Examples are illustrative of the present invention, but are not intended to limit the invention in any way beyond what is contained in the claims which follow.

EXAMPLE 1

USY Zeolite

Properties of the desirable USY zeolites are summarized as follows:

TABLE 1

Physical Properties of Highly Dealuminated USY

|  | Desirable USY #1 | Desirable USY #2 |
|---|---|---|
| $SiO_2/Al_2O_3$ molar ratio | 88 | 126 |
| $Na_2O$, wt % | <0.05 | 0.1 |
| Surface area, $m^2/g$ | 686 | 690 |
| Micropore pore volume, cc/g | 0.25 | 0.27 |
| Total pore volume, cc/g | 0.51 | 0.54 |
| Unit cell size, Å | 24.24 | 24.25 |
| % Crystallinity | — | 99 |
| Alpha | 1.1 | 1.4 |
| Broensted acidity by FT-IR, $\mu$mole/g | 9 | 15 |

Desirable USY zeolites are highly dealuminated and stabilized with the bulk $SiO_2/Al_2O_3$ ratio of over 80. The unit cell size measured by powder X-ray diffraction shows the unit cell size of 24.25 Å or less. In addition, we found that USY with very low Broensted acidity is critical for performance of finished hydrocracking catalysts. We found that Broensted acidity measurement by FT-IR and a model compound cracking testing using n-hexane can distinguish desirable USY samples. Desirable USY for heavy-distillate selective hydrocracking shows Alpha values of less than 5, and Broensted acidity of 1–20 micromole/g measured by FT-IR. Hydrocracking catalysts comprising this type of USY show significantly superior distillate selectivity over a catalyst made with USY with greater than 5 alpha and greater than 40 micromole/g of Broensted acidity.

Due to extremely low acidity of these preferred USY, the hydrocracking catalysts require to have a secondary homogeneous cracking component. The most desirable homogeneous cracking component is silica-alumina with isomerization and cracking activity. By combining the homogeneous cracking component and low acidity zeolite we were able to produce unique catalysts with desirable product selectivity, activity, and stability.

EXAMPLE 2

Homogeneous Cogel Silica-Alumina

The following three homogeneous cogel silica-alumina samples were used for catalyst preparations. The silica-alumina has approximately 1.0 Si/Al atomic ratio in bulk. The composition is uniform in that the surface Si/Al ratios measured by XPS matches that of the bulk composition, and a separate phase of crystalline alumina detected by XRD is less than 10 wt %. Properties of the homogeneous cogel silica-alumina are summarized as follows:

TABLE 2

Physical Properties of Homogeneous Cogel Silica-Alumina

|  | Desirable Silica-Alumina #1 | Desirable Silica-Alumina #2 | Desirable Silica-Alumina #3 |
|---|---|---|---|
| Surface area, $m^2/g$ (a) | 362 | 401 | 418 |
| Total pore volume, cc/g (b) | 0.51 | 0.58 | 0.55 |
| Pore size distribution by $N_2$ Adsorption (b) | | | |
| 30 Å–, % | 8.6 | 6.7 | 11.4 |
| 30–60 Å, % | 55.5 | 63.4 | 54.7 |
| 60–100 Å, % | 32.9 | 28.5 | 25.2 |
| 100–200 Å, % | 1.4 | 0.9 | 6.3 |
| 200–300 Å, % | 0.4 | 0.2 | 1.0 |
| 300 Å+, % | 1.2 | 0.3 | 1.4 |
| Mean Pore Diameter, Å | 69 | 62 | 71 |
| Na, wt % | <0.05 | <0.05 | <0.05 |
| Surface Si/Al atomic ratio, by XPS | 0.98 | 0.72 | 1.07 |
| Bulk Si/Al atomic ratio, by elemental anal. | 1.03 | 0.98 | 1.03 |
| Surface to Bulk Si/Al Ratio | 0.95 | 0.73 | 1.04 |
| % crystalline alumina phase, by XRD | 0% | 9% | 0% |
| $nC_6 + iC_6$ Model Compound Testing (b) | | | |
| Total conversion, wt % | 8.2 | 9.1 | 11.3 |
| $nC_6$ conversion, wt % | 1.0 | 0.9 | 1.3 |
| $iC_6$ conversion, wt % | 15.4 | 17.3 | 21.3 |

(a): BET measurements after activation at 1000° F. for 1 hr.
(b): determined after activation at 1000° F. for 1 hr.

EXAMPLE 3

Preparation of NiW Hydrocracking Catalyst with Homogeneous Cogel Silica-Alumina (Catalyst A—base-case)

A base-case hydrocracking catalyst containing homogeneous silica-alumina sample #1 from Table 2 was prepared per following procedure. 75 parts silica-alumina powder #1 (synthesized per patent application XXXX) and 25 parts crystalline alumina powder (obtained from Vista) were mixed well. To the mix, diluted $HNO_3$ acid and sufficient amount of deionized water were added to form an extrudable paste (3 wt % $HNO_3$ to the total powders). These weights are on 100% solids basis. The paste was extruded in 1/16" cylinder, and dried at 250° F. overnight. The dried extrudates were calcined at 1100° F. for 1 hour with purging excess dry air, and cooled down to room temperature.

Impregnation of Ni and W was done using a solution containing ammonium metatungstate and nickel nitrate to the target metal loadings of 4 wt % NiO and 28 wt % $WO_3$ in the finished catalyst. The total volume of the solution matched the 100% water pore volume of the base extrudate sample (incipient wetness method). The metal solution was added to the base extrudates gradually while tumbling the extrudates. When the solution addition was complete, the soaked extrudates were aged for 2 hours. Then the extrudates were dried at 250° F. overnight. The dried extrudates were calcined at 935° F. for 1 hour with purging excess dry air, and cooled down to room temperature. This catalyst is named Catalyst A and its physical properties are summarized in Table 4.

EXAMPLE 4

Preparation of NiW USY Hydrocracking Catalysts (Catalyst B)

Catalyst B, a NiW USY catalyst useful for this invention containing USY #1 from Table 1 and silica-alumina #2 from Table 2 was prepared per following procedure. 10 parts USY, 65 parts silica-alumina powder and 25 parts pseudo-boehmite alumina powder were mixed well. To the mix, diluted $HNO_3$ acid and sufficient amount of deionized water were added to form an extrudable paste (3 wt % $HNO_3$ to the total powders). These weights are on 100% solids basis. The paste was extruded in 1/16" cylinder, and dried at 250° F. overnight. The dried extrudates were calcined at 1100° F. for 1 hour with purging excess dry air, and cooled down to room temperature.

Impregnation of Ni and W was done using a solution containing ammonium metatungstate and nickel nitrate to the target metal loadings of 4 wt % NiO and 28 wt % $WO_3$ in the finished catalyst. The total volume of the solution matched the 100% water pore volume of the base extrudate sample (incipient wetness method). The metal solution was added to the base extrudates gradually while tumbling the extrudates. When the solution addition was complete, the soaked extrudates were aged for 2 hours. Then the extrudates were dried at 250° F. overnight. The dried extrudates were calcined at 935° F. for 1 hour with purging excess dry air, and cooled down to room temperature. This catalyst is named Catalyst B and its physical properties are summarized in Table 4.

EXAMPLE 5

Preparation of Hydrocracking Catalysts with Various USY and Silica-Alumina Samples (Catalysts C, D and E)

Catalyst C, a NiW catalyst useful for this invention containing USY, was prepared using a procedure similar to Catalyst B. For Catalyst C, 3 parts USY #1 from Table 1, 72 parts silica-alumina #3 from Table 2 and 25 parts pseudo-boehmite alumina powder were used to prepare the base extrudates. Then Ni and W were loaded via impregnation as described in the Example 5. The target metal loadings were 4 wt % NiO and 28 wt % $WO_3$. Physical properties of Catalyst C are summarized in Table 4.

Catalyst D, a noble metal USY catalyst useful for this invention, was prepared from the same H-form extrudate base as the Catalyst C. Impregnation of Pt and Pd was done using a solution containing platinum tetraammine nitrate and palladium tetraammine nitrate to the target metal loadings of 0.2 wt % Pt and 0.15 wt % Pd in the finished catalyst. The total volume of the solution matched the 100% water pore volume of the base extrudate sample (incipient wetness method). The metal solution was added to the base extrudates gradually while tumbling the extrudates. When the solution addition was complete, the soaked extrudates were aged for 2 hours. Then the extrudates were dried at 250° F. overnight. The dried extrudates were calcined at 750° F. for 1 hour with purging excess dry air, and cooled down to room temperature.

Catalyst E, a NiW catalyst useful for this invention containing USY #2 and homogeneous silica-alumina with properties described in Table 2, was prepared using a procedure nearly identical to Catalyst C.

Feedstock for Catalyst Performance Evaluation

A petroleum feedstock with the following properties was used to evaluate the catalysts.

TABLE 3

Feedstock Properties

| Properties | |
|---|---|
| API Gravity | 33.7 |
| Sulfur, ppm wt | 7 |
| Nitrogen, ppm wt | 0.7 |
| D2887 Simdis, ° F. | |
| Start Point | 645 |
| 10 wt % | 707 |
| 30 wt % | 769 |
| 50 wt % | 826 |
| 70 wt % | 890 |
| 90 wt % | 977 |
| End Point | 1079 |

EXAMPLE 6

Comparison of Catalyst Performance for Distillate Production in a Single-Pass Mode (Catalyst A vs. B, C, and D)

Catalysts of our invention (Catalysts B through D) were compared in a single-pass micro unit with a reference catalyst, Catalyst A. Catalyst A was made with the homogeneous silica-alumina from Table 2 and $Al_2O_3$ binding material, and no zeolite was added to the base formulation. Catalysts B, C, and D contain 2–7 wt % highly dealuminated USY zeolite in the finished catalysts. Catalysts A, B, and C contain the Group VI and VIII base metals (Ni and W), and Catalyst D contains Group VIII noble metals (Pd and Pt).

Micro unit evaluation of catalysts was done in a once-through, down-flow micro unit with 6 cc of 24/40 (US) meshed catalyst. Process conditions were approximately 2000 psig reactor pressure, a feed rate of 1.5 $hr^{-1}$ LHSV and once-though $H_2$ flow rate corresponding 5000 SCF of $H_2$/bbl of oil. The catalyst bed temperature was varied to cover 60–80 wt % of conversion of the 700° F.$^+$ feed to 700° F.$^-$ product. The yields of $C_4^-$ gas, naphtha, light and heavy-distillate components were calculated using D2887 Simdis analysis results. The overall yields and reactor temperature data were interpolated to 70 wt % conversion and summarized in Table 4.

Recycling pilot unit evaluations were done with 130 cc of extrudate catalyst by recycling unconverted 700° F. bottom and $H_2$ gas. Fresh feed was added to the recycled feed and the feed rate was adjusted to maintain 60 vol % pre-pass conversions. Fresh make-up $H_2$ gas was added to the

TABLE 4

Catalyst Properties and Performance

|  | Catalyst A Non-Invention | Catalyst B Invention | Catalyst C Invention | Catalyst D Invention |
|---|---|---|---|---|
| Composition (before metals addition) | | | | |
| USY | No USY | 10% USY | 3% USY | 3% USY |
| Silica-Alumina | 80% Cogel #1 | 65% Cogel #2 | 72% Cogel #3 | 72% Cogel #3 |
| $Al_2O_3$ Binder | 20% | 25% | 25% | 25% |
| Properties after Metals Addition | | | | |
| Metal #1, wt % | 3.9% Ni | 3.1% Ni | 3.0% Ni | 0.2% Pt |
| Metal #2, wt % | 18.7% W | 20.6% W | 19.9% W | 0.15% Pd |
| Surface area, $m^2/g$ | 182 | 217 | 168 | 280 |
| Catalyst Performance in Single-Pass Micro Unit | | | | |
| Activity, F for 70% Conv. of 700° F.+ | 717 | 705 | 712 | 683 |
| No-Loss Yields @ 70% Conv., wt % | | | | |
| C4– Gas | 2.9 | 3.0 | 3.3 | 2.7 |
| Naphtha (C5–250° F.) | 12.8 | 13.1 | 12.4 | 11.7 |
| Light-Distillate (250–550° F.) | 37.2 | 39.1 | 38.1 | 39.2 |
| Heavy-Distillate (550–700° F.) | 21.1 | 18.9 | 20.3 | 20.5 |
| Total Distillate (250–700° F.) | 58.3 | 58.0 | 58.4 | 59.7 |
| Accelerated Fouling Test | | | | |
| Fouling rate, ° F./ 1000 hrs | 43 | 15 | 9 | — |

Our catalysts of invention (Catalysts B and C) showed improvement of catalyst activity by 5–12° F. relative to the cogel catalyst. Compared to Catalyst A (the base case), our catalysts maintained the total distillate yield while showing improved activity. By adjusting the zeolite content, the fractional yields of light- and heavy-distillate can be varied to the desirable level (for jet production vs. diesel production). A noble metal catalyst of our invention (Catalyst D) showed further improvement in the catalyst activity and the total distillate yield over the reference and corresponding base metal catalysts.

The stabilities of the catalysts were compared in a sing-pass micro unit at accelerated fouling conditions (50% increase of oil flow rate and 25% reduction in reactor pressure). The stability data were calculated using the reactor temperature change required to maintain a 70% conversion per 1000 hours of stream time. The catalyst of our invention shows superior aging characteristics in that it deactivated only at ¼–⅓ the rate of the cogel catalyst.

To summarize, our catalysts of invention showed that combination of a small amount of highly dealuminated USY zeolite and homogeneous cogel silica-alumina in a hydrocracking catalyst generated unexpected benefits: (1) the catalyst activity is improved significantly, (2) the total distillate yield is maintained with the broad range of USY addition, (3) the respective yields of light-distillate vs. heavy-distillate can be adjusted with the USY content, and (4) the catalyst become much more stable and showed significantly lower fouling rates.

EXAMPLE 7

Comparison of Catalyst Performance for Max Distillate Production (Cogel Catalyst vs. Catalyst B)

Catalyst B of our invention was compared with Catalyst F, which is the state-of-the-art cogel catalyst for a hydrocracking process in a recycle pilot unit.

recycled $H_2$ gas stream to maintain 5000 SCF/bbl of recycled gas flow. Process conditions were:

| Pressure: | 2300 psig total reactor pressure |
|---|---|
| LHSV: | 1.0 $hr^{-1}$ |
| Recycle $H_2$: | 5000 SCF/ bbl |

The yields of $C_4^-$ gas, naphtha, light- and heavy-distillate components were calculated using D2887 Simdis analysis results. The overall yields and reactor temperature data were summarized in Table 5.

TABLE 5

Physical Properties and Performance of Catalysts for Distillate Production

|  | Catalyst F State-of-the Art Cogel Catalyst Non-Invention | Catalyst B Invention |
|---|---|---|
| Composition (before metals addition) | | |
| USY | No USY | 10% USY |
| Silica-Alumina | — | 65% Cogel |
| $Al_2O_3$ Binder | No binder | 25% |
| Properties after Metals Addition | | |
| Ni, wt % | 7.7 | 3.1 |
| W, wt % | 18.2 | 20.6 |
| Surface area, $m^2/g$ | 289 | 217 |

TABLE 5-continued

Physical Properties and Performance of Catalysts for Distillate Production

|  | Catalyst F State-of-the Art Cogel Catalyst Non-Invention | Catalyst B Invention |
|---|---|---|
| Catalyst Performance in Recycle Pilot Unit | | |
| Activity, Catalyst Average Temp ° F.+ | 681 | 677 |
| No-Loss Yields | | |
| $C_4^-$ Gas, wt % | 4.8 | 3.0 |
| Naphtha (C5–250° F.), vol % | 20.9 | 20.2 |
| Light-Distillate (250–550° F.), vol % | 50.4 | 55.1 |
| Heavy-Distillate (550–700° F.), vol % | 35.8 | 33.8 |
| Total Distillate (250 F–700° F.), vol % | 86.5 | 88.9 |
| Product Properties of Light-Distillate | | |
| Smoke Point, mm | 40 | 43 |
| Freeze Point, ° C. | −61 | −59 |
| Cetane Number | 51.5 | 53 |
| Product Properties of Heavy-Distillate | | |
| Cetane Number | 71 | 74 |

Our catalyst of invention (Catalyst B) shows performance exceeding that of the state-of-the-art cogel catalyst (Catalyst F). Our catalyst shows advantage in that Catalyst B has comparable or better activity, makes substantially less undesirable light-gas and naphtha, and produces more distillate fraction. Catalyst B exhibited over 2 vol % advantage in the total distillate yield where the improvement is mainly in the light distillate fraction. By lowering the USY zeolite content further, we expect the distillate distribution is shifted toward the heavier fraction.

The overall product properties with the catalysts of our invention are comparable or better than those of the cogel catalyst. The catalyst of our invention produces distillate with improved Cetane Numbers. Other properties of the distillate products such as the Smoke Point, Freeze Point, and Cloud Point were comparable.

The catalyst of our invention is good at maintaining the heavy-distillate with 550–700° F. boiling point range (over 70 cetane). Since the cetane number of this fraction is much higher than that of the light-distillate with 250–550° F. boiling point range (around 50 cetane), it is desirable to maximize the heavy-distillate contribution to the combined distillate pool.

To summarize, our catalyst produced improved quality distillate products in high yields while having advantages of zeolite containing hydrocracking catalysts.

While we do not want to be bound by the theory, the performance advantage of our catalyst appears to come from enhancement of isomerization activity of the catalyst by adding a small amount of highly dealuminated USY. Typically addition of USY zeolite to the distillate-selective amorphous hydrocracking catalyst causes unwanted overcracking toward naphtha. In our catalyst system, we were able to suppress the unwanted overcracking by USY and able to obtain synergistic performance advantage of homogeneous cogel silica-alumina and extremely low acidity of USY.

EXAMPLE 8

Comparison of Catalyst Performance for Unconverted Oil (Bottoms) Properties for Lubricating Oil Production (Cogel Catalyst vs. and Catalyst E)

The per-pass conversion of the recycle pilot unit evaluation in Example 7 was changed to 40 vol %, and 40 wt % of the unconverted oil (700° F.+ fraction) was drained. Then product properties were evaluated to examine the potential of this process for lubricating oil base stock production.

TABLE 6

Performance of Catalysts for Lube Base Stock Production

|  | Catalyst F State-of-the Art Cogel Catalyst Non-Invention | Catalyst E Invention |
|---|---|---|
| Unconverted Oil (700° F.+), As-Produced | | |
| API Gravity at 60/60 | 37.4 | 37.2 |
| Viscosity Index | 136 | 145 |
| Solvent Dewaxed Oil | | |
| Viscosity Index | 131 | 133 |

The Viscosity Index (waxy VI) of the unconverted oil from the catalyst of our invention showed substantially higher value that that from the cogel catalyst. It was completely unexpected that the zeolite containing hydrocracking catalyst produced 700° F.+ bottoms with higher waxy VI than the amorphous catalyst. The fractions were subjected to MEK/toluene dewaxing step to provide the finished lubricating oil base stock products. The improved VI with our catalyst was maintained after the solvent dewaxing.

While this example included the solvent dewaxing step to produce the finished lubricating oil base stock, it is preferable to perform catalytic dewaxing to generate high quality lube base stock.

The following Examples are illustrative of the present invention, but are not intended to limit the invention in any way beyond what is contained in the claims which follow.

What is claimed is:

1. A process for converting hydrocarbonaceous oils into products of lower average molecular weight and lower average boiling point comprising contacting said hydrocarbonaceous oils under hydrocracking conditions with a catalyst comprising (1) a minor amount of a low acidity, highly dealuminated ultrastable Y zeolite having an Alpha value of less than about 5 and Broensted acidity of from about 1 to about 20 micromole/g measured by FT-IR, (2) a homogeneous, amorphous silica-alumina cracking component having an SB ratio of from about 0.7 to about 1.3, wherein a crystalline alumina phase is present in an amount of no greater than about 10% and (3) a catalytic amount of hydrogenation component selected from the group consisting of a Group VI metal, a Group VIII metal, and mixtures thereof.

2. A process according to claim 1, wherein the catalyst composition comprises from about 0.5 to about 30 wt % of the ultrastable Y zeolite.

3. A process according to claim 1, wherein the catalyst composition comprises from about 1 to about 20 wt % of the ultrastable Y zeolite.

4. A process according to claim 1, wherein the catalyst further comprises an inorganic oxide binder.

5. A process according to claim 1, wherein the homogeneous silica-alumina cracking component is highly homogeneous having an SB silica to alumina ratio of from about 0.9 to about 1.1 and a crystalline alumina phase present in an amount no more than about 5%.

6. A process according to claim 5, wherein the homogeneous silica-alumina cracking component has an SB ratio of about 1.0.

7. A process according to claim 4, wherein the catalyst comprises from about 0.5% to 30% by weight of ultrastable Y zeolite, from about 10% to 80% by weight of amorphous cracking component, and from about 10% to 30% by weight of a binder.

8. A process according to claim 1, wherein the Group VIII metal hydrogenation component is selected from the group consisting of nickel, cobalt, platinum, palladium and mixtures thereof and wherein the Group VI metal hydrogenation component is selected from the group consisting of molybdenum, tungsten and mixtures thereof.

9. A process according to claim 8, wherein the hydrogenation component comprises from about 2% to about 8% by weight of nickel and from about 8% to about 30% by weight of tungsten, calculated as metals per 100 parts by weight of total catalyst.

10. A process according to claim 8, wherein the hydrogenation component comprises from 0.2% to about 2% by weight of platinum, or from about 0.2% to about 2% by weight of palladium, or a combination of from 0.2% to about 2% by weight of platinum and palladium, calculated as metals per 100 parts by weight of total catalyst.

11. A process for producing high quality distillate with increased yield of heavy distillate from heavy gas oils comprising contacting a heavy gas oil under hydrocracking conditions with a catalyst comprising (1) a minor amount of a low acidity, highly dealuminated ultrastable Y zeolite having an Alpha value of less than about 5, and Broensted acidity of from about 1 to about 20 micromole/g measured by FT-IR, (2) a homogeneous, amorphous silica-alumina cracking component having an SB ratio of from about 0.7 to about 1.3, wherein a crystalline alumina phase is present in an amount of no greater than about 10% and (3) a catalytic amount of hydrogenation component selected from the group consisting of a Group VI metal, a Group VIII metal, and mixtures thereof.

12. A process according to claim 11, wherein the catalyst composition comprises from about 0.5 to about 30 wt % of the ultrastable Y zeolite.

13. A process according to claim 11, wherein the catalyst composition comprises from about 1 to about 20 wt % of the ultrastable Y zeolite.

14. A process according to claim 11, wherein the catalyst further comprises an inorganic oxide binder.

15. A process according to claim 11, wherein the homogeneous silica-alumina cracking component is highly homogeneous having an SB silica to alumina ratio of from about 0.9 to about 1.1 and a crystalline alumina phase present in an amount no more than about 5%.

16. A process according to claim 15, wherein the homogeneous silica-alumina cracking component has an SB ratio of about 1.0.

17. A process according to claim 14, wherein the catalyst comprises from about 0.5% to 30% by weight of ultrastable Y zeolite, from about 10% to 80% by weight of amorphous cracking component, and from about 10% to 30% by weight of a binder.

18. A process according to claim 11, wherein the Group VIII metal hydrogenation component is selected from the group consisting of nickel, cobalt, platinum, palladium and mixtures thereof and wherein the Group VI metal hydrogenation component is selected from the group consisting of molybdenum, tungsten and mixtures thereof.

19. A process according to claim 18, wherein the hydrogenation component comprises from 2% to about 8% by weight of nickel and from about 8% to about 30% by weight of tungsten, calculated as metals per 100 parts by weight of total catalyst.

20. A process according to claim 18, wherein the hydrogenation component comprises from 0.2% to about 2% by weight of platinum, or from about 0.2% to about 2% by weight of palladium, or a combination of from 0.2% to about 2% by weight of platinum and palladium, calculated as metals per 100 parts by weight of total catalyst.

21. A hydrocracking catalyst composition comprising (1) a minor amount of a low acidity, highly dealuminated ultrastable Y zeolite having an Alpha value of less than about 5 and Broensted acidity of from about 1 to about 20 micromole/g, (2) a homogeneous, amorphous silica-alumina cracking component having an SB ratio of from about 0.7 to about 1.3, wherein a crystalline alumina phase is present in an amount of no greater than about 10% and (3) a catalytic amount of hydrogenation component selected from the group consisting of a Group VI metal, a Group VIII metal, and mixtures thereof.

22. A composition according to claim 21, wherein the catalyst comprises from about 0.5 to about 30 wt % of the ultrastable Y zeolite.

23. A composition according to claim 21, wherein the catalyst comprises from about 1 to about 20 wt % of the ultrastable Y zeolite.

24. A composition according to claim 21, wherein the catalyst further comprises an inorganic oxide binder.

25. A composition according to claim 21, wherein the homogeneous silica-alumina cracking component is highly homogeneous having an SB silica to alumina ratio of from about 0.9 to about 1.1 and a crystalline crystalline alumina phase present in an amount no more than about 5%.

26. A composition according to claim 25, wherein the homogeneous silica-alumina cracking component has an SB ratio of about 1.0.

27. A composition according to claim 21, wherein the catalyst comprises from about 0.5% to 30% by weight of ultrastable Y zeolite, from about 10% to 80% by weight of amorphous cracking component, and from about 10% to 30% by weight of a binder.

28. A composition according to claim 21, wherein the Group VIII metal hydrogenation component is selected from the group consisting of nickel, cobalt, platinum, palladium and mixtures thereof and wherein the Group VI metal hydrogenation component is selected from the group consisting of molybdenum, tungsten and mixtures thereof.

29. A composition according to claim 28, wherein the hydrogenation component comprises from 2% to about 8% by weight of nickel and from about 8% to about 30% by weight of tungsten, calculated as metals per 100 parts by weight of total catalyst.

30. A composition according to claim 28, wherein the hydrogenation component comprises from 0.2% to about 2% by weight of platinum, or from about 0.2% to about 2% by weight of palladium, or a combination of from 0.2% to about 2% by weight of platinum and palladium, calculated as metals per 100 parts by weight of total catalyst.

31. A process for producing a lubricating oil base stock which comprises:

(a) contacting a feedstock under hydrocracking conditions with a catalyst comprising a minor amount of a low acidity, highly dealuminated ultrastable Y zeolite having an Alpha value of less than about 5 and Broensted acidity of from about 1 to about 10 micromole/g, a homogeneous, amorphous silica-alumina cracking component having an SB ratio of from about 0.7 to about 1.3, wherein a crystalline alumina phase is present in an amount of no greater than about 10% and a catalytic amount of hydrogenation component selected from the group consisting of a Group VI metal, a Group VIII metal, and mixtures thereof; and (b) processing the hydrocracked product to provide a lubricating oil base stock.

* * * * *